United States Patent
Bansal et al.

(10) Patent No.: US 8,951,325 B2
(45) Date of Patent: Feb. 10, 2015

(54) BI-COMPONENT FIBER AND FILTER MEDIA INCLUDING BI-COMPONENT FIBERS

(71) Applicant: BHA Altair, LLC, Franklin, TN (US)

(72) Inventors: Vishal Bansal, Overland Park, KS (US); Jeffery Michael Ladwig, Overland Park, KS (US); Rana Ghufran Rasheed, Overland Park, KS (US)

(73) Assignee: BHA Altair, LLC, Franklin, TN (US)

( * ) Notice: Subject to any disclaimer, the term of this patent is extended or adjusted under 35 U.S.C. 154(b) by 150 days.

(21) Appl. No.: 13/778,449

(22) Filed: Feb. 27, 2013

(65) Prior Publication Data

US 2014/0237968 A1 Aug. 28, 2014

(51) Int. Cl.
*B01D 46/00* (2006.01)
*B01D 39/16* (2006.01)

(52) U.S. Cl.
CPC .................................. *B01D 39/1623* (2013.01)
USPC .................. 55/529; 56/527; 56/528; 56/529; 56/486; 428/365; 428/373; 428/401

(58) Field of Classification Search
CPC .................................................... B01D 39/1623
USPC ............ 55/527–529, 486; 428/365, 373, 401; 156/62.4
See application file for complete search history.

(56) References Cited

U.S. PATENT DOCUMENTS

| | | | |
|---|---|---|---|
| 6,159,599 A * | 12/2000 | Sandor et al. | 428/373 |
| 6,409,785 B1 | 6/2002 | Smithies et al. | |
| 6,949,288 B2 | 9/2005 | Hodge et al. | |
| 7,985,275 B2 | 7/2011 | Smithies | |
| 7,998,577 B2 | 8/2011 | Rollin, Jr. et al. | |
| 2003/0134099 A1 | 7/2003 | Barrows | |
| 2004/0132376 A1* | 7/2004 | Haworth | 442/364 |
| 2010/0151760 A1* | 6/2010 | Laura et al. | 442/364 |
| 2012/0276360 A1 | 11/2012 | Kwak | |

FOREIGN PATENT DOCUMENTS

KR 930003368 B1 4/1993

* cited by examiner

*Primary Examiner* — Jason M Greene
*Assistant Examiner* — Karla Hawkins
(74) *Attorney, Agent, or Firm* — Reinhart Boerner Van Deuren P.C.

(57) ABSTRACT

A bi-component fiber is provided. The bi-component fiber includes a sheath formed of polyphenylene sulfide (PPS) and a core formed of a high glass transition polyester. A PPS material of the sheath has a higher melting point than a high glass transition polyester material of the core. The core is at least partially crystallized whereby the high glass transition polyester material of the core effectively has a higher softening point than a softening point of the PPS material of the sheath.

24 Claims, 1 Drawing Sheet

BI-COMPONENT FIBER AND FILTER MEDIA INCLUDING BI-COMPONENT FIBERS

BACKGROUND OF THE INVENTION

The subject matter disclosed herein relates to bi-component fibers and, more particularly, to filter media having bi-component fibers.

A high glass transition temperature polyester, which is derived from cyclohexanedimethanol and terephthalic acid to form poly(cyclohexanedimethylene terephthalate) and which is commonly referred to as PCT, has been recently available. This material has sufficient temperature resistance to be useful in various applications including, but not limited to filtration fabrics for utility and waste energy markets. In practice, however, PCT has been found lacking in acid resistance characteristics.

BRIEF DESCRIPTION OF THE INVENTION

According to one aspect of the invention, a bi-component fiber is provided. The bi-component fiber includes a sheath formed of polyphenylene sulfide (PPS) and a core formed of a high glass transition polyester. A PPS material of the sheath has a higher melting point than a high glass transition polyester material of the core. The core is highly crystallized whereby the high glass transition polyester material of the core effectively has a higher softening point than a softening point of the PPS material of the sheath.

According to another aspect of the invention, a filter medium is provided and includes a plurality of bi-component fibers and a porous membrane to which the plurality of bi-component fibers is fixedly attached. Each bi-component fiber includes a sheath formed of polyphenylene sulfide (PPS) and a core formed of a high glass transition polyester. A PPS material of the sheath has a higher melting point than a high glass transition polyester material of the core, and the core is at highly crystallized whereby the high glass transition polyester material of the core effectively has a higher softening point than a softening point of the PPS material of the sheath.

According to yet another aspect of the invention, a method of forming a filter medium is provided. The method includes manufacturing a plurality of bi-component fibers, assembling the plurality of bi-component fibers into a felt material and laminating the felt material onto a porous membrane. Each bi-component fiber includes a sheath formed of polyphenylene sulfide (PPS) and a core formed of a high glass transition polyester. A PPS material of the sheath has a higher melting point than a high glass transition polyester material of the core, and the core is highly crystallized whereby the high glass transition polyester material of the core effectively has a higher softening point than a softening point of the PPS material of the sheath.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

A bi-component fiber has a sheath formed of polyphenylene sulfide (PPS) and a core formed of poly(cyclohexanedimethylene terephthalate) PCT polymer. Such a fiber would have advantages associated with chemical resistance from the PPS polymer and sufficient temperature resistance to be useful in filtration applications. A problem exists, however, in that PCT polymer has a lower softening temperature than the PPS polymer. In fact, PCT polymer softens at a temperature of about 205° C. whereas PPS polymer softens at a temperature of about 220° C. or higher. This is generally not a problem when using the bi-component fiber in filtration applications as such applications are usually conducted below 205° C. Still, if the fiber or felt made from these fibers is to be thermally laminated to another fine filtration layer, for example, a porous layer of polytetrafluoroethylene (PTFE) the lamination process may be conducted at a temperature that is too hot for the fiber to maintain its structural integrity.

The process of thermal lamination involves heating the fiber or felt to a temperature above its softening point and then combining it with the fine filtration layer. Thus, in order to thermally laminate the bi-component fibers discussed herein, the felt would need to be heated to a temperature higher than 220° C. and, in some cases, higher than 230° C. Since the softening point of PCT polymer is around 205° C., as noted above, the thermal lamination process may lead to deformation of the bi-component fiber and the loss of its strength properties.

The description provided below relates to a bi-component fiber made from a PPS polymer sheath and a PCT polymer core that provides temperature resistance above the temperatures associated with thermal lamination. The above-noted deformation of the bi-component fiber can therefore be avoided.

Figure 1:
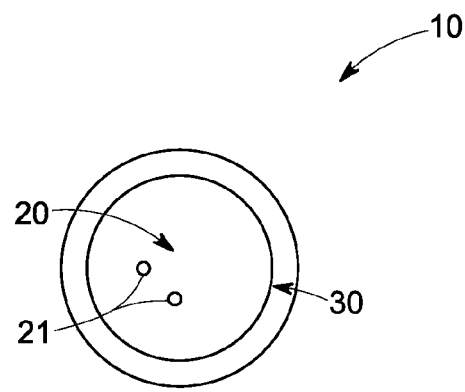
FIG. 1 is an axial view of a bi-component fiber in accordance with embodiments.

With reference to FIG. 1, a bi-component fiber 10 is provided and has a core-sheath structure in which a core 20 is perimetrically surrounded along its axial length by a sheath 30. The sheath 30 is formed of polyphenylene sulfide (PPS) and the core 20 formed of a high glass transition polyester, such as a polyester derived from cyclohexanedimethanol and terephthalic acid to form PCT polymer. In accordance with embodiments, the PPS polymer material of the sheath 30 has a higher melting point than the high glass transition polyester material of the core 20. In addition, the core 20 is highly crystallized (i.e., the core 20 exhibits at least partial crystallinity). This provides the PCT polymer material of the core 20 with an effectively higher softening point than the softening point of the PPS polymer material of the sheath 30. As such and as will be described below, this configuration permits the bi-component fiber 10 to be used in a variety of applications. For example, a plurality bi-component fibers 10 may be thermally laminated to a membrane to form a filter medium for a filter of a coal-fired utility.

In order to increase the crystallinity of the core 20, the bi-component fiber 10 may be further provided with additional materials to aid nucleation. In accordance with embodiments, the core 20 may include inorganic filler material 21. As examples, the inorganic filler material 21 may be titanium oxide (TiO2), calcium carbonate (CaCO3) or some form of glass fiber that can provide the bi-component fiber 10 with increased temperature stability.

Figure 2:
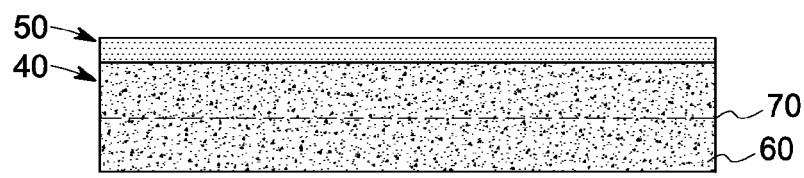
FIG. 2 is a side view of a felt material including a plurality of bi-component fibers in accordance with embodiments.

With reference to FIG. 2, a filter medium 40 is provided and includes a plurality of bi-component fibers 10 formed substantially as described above and a porous membrane 50 to which each of the plurality of bi-component fibers 10 are fixedly attached. In some cases, the plurality of bi-component fibers 10 are needlepunched and disposed to form a felt material 60, which is laminated (e.g., thermally laminated) to the porous membrane 50. In accordance with embodiments, a material of the porous membrane 50 may include PTFE or some other suitable material. A woven scrim 70 formed of PPS polymer fibers may be disposed among the plurality of bi-component fibers 10 for increased strength and for structural support of the needlepunched felt material 60.

Figure 3:
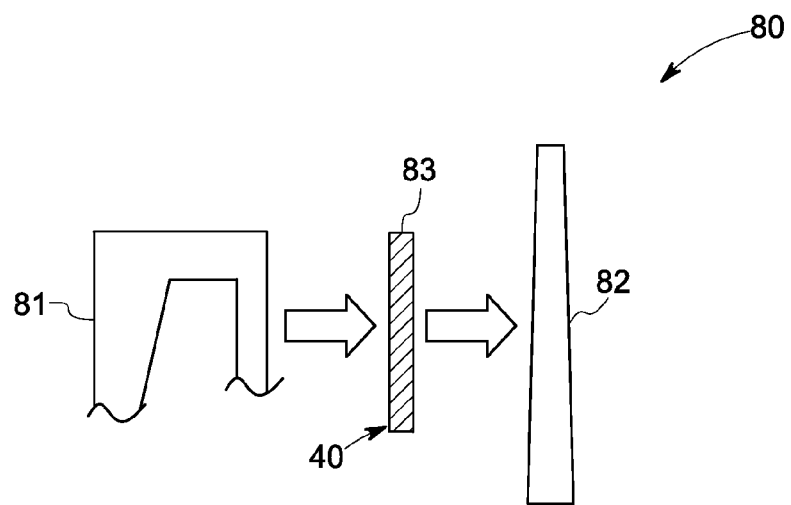
FIG. 3 is a side schematic view of a filter having a filter medium including the felt material of FIG. 2.

With reference to FIG. 3, the filter medium 40 may be provided for use in filtering flue gas in a coal-fired boiler 80. In such an application, the flue gas is produced in a coal-fired boiler 81 and exhausted to the atmosphere via a stack 82 disposed downstream from the coal-fired boiler 81. A filter element 83, which includes the filter medium 40, may be disposed between the coal-fired boiler 81 and the outlet of the stack 82 to collect pollutants and dust.

In accordance with further aspects, the filter medium 40 may be manufactured by assembling the plurality of bi-component fibers 10 into the felt material 60 and laminating (e.g., thermally laminating) the felt material 60 onto the porous membrane 50. The increase in crystallinity of the core 20 PCT polymer can be achieved by delaying the cooling (quenching) process of each of the bi-component fibers 10 and, in some cases, adding nucleating sites via inorganic fillers.

The crystallization of the PCT polymer of the core 20 provides for the high softening point of the core 20. This, in turn, permits the thermal lamination of the plurality of bi-component fibers 10 to the porous membrane 50 at a temperature above the softening point of the PPS polymer material of the sheath 30 but without risking structural degradation or deformation of each of the plurality of bi-component fibers 10.

The bi-component fibers 10 described above may have a polymer ratio of about 40% PCT polymer and about 60% PPS polymer (by weight). During manufacturing, the bi-component fibers 10 are cut to staple length and then converted into a nonwoven structure via needlefelting processes. The felt material 60 may have a unit weight of 15 oz/yd$^2$ and the woven scrim 70 may have a unit weight of 3 oz/yd$^2$. The felt material 60 may be thermally laminated to a layer of porous membrane 50 (i.e., an expanded PTFE membrane) at a temperature of about 450° F. To further reduce the damage of the core 20 PCT polymer, it may be beneficial to immediately quench the laminate with a chilled water cooled roll. The chilled roll should be kept at temperature of about 40 dg F.

The filter medium 40 formed of the bi-component fibers 10 may have an air permeability of 4.7 ft$^3$/ft$^2$/min @½" H$_2$O, a mullen burst of 520 psi, a creep % of 0.15 as determined using dynamic thermomechanical analysis and VDI emissions of about 0. Where the filter medium 40 is formed of the bi-component fibers 10 including the inorganic filler material 21, the filter medium 40 may have an air permeability of 5.7 ft$^3$/ft$^2$/min.@½" H$_2$O, a mullen burst of 500 psi, a creep % of 0.10 as determined using dynamic thermomechanical analysis and VDI emissions of about 0.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A bi-component fiber, comprising:
   a sheath formed of polyphenylene sulfide (PPS); and
   a core formed of a high glass transition polyester,
   a PPS material of the sheath having a higher melting point than a high glass transition polyester material of the core, and
   the core being at least partially crystallized whereby the high glass transition polyester material of the core effectively has a higher softening point than a softening point of the PPS material of the sheath.

2. The bi-component fiber according to claim 1, wherein the high glass transition polyester material of the core comprises a polyester derived from cyclohexanedimethanol and terephthalic acid.

3. The bi-component fiber according to claim 1, wherein the core comprises inorganic filler material.

4. The bi-component fiber according to claim 1, wherein the core comprises carbonate additives.

5. A filter medium, comprising:
   a plurality of bi-component fibers, each bi-component fiber including a sheath formed of polyphenylene sulfide (PPS) and a core formed of a high glass transition polyester, a PPS material of the sheath having a higher melting point than a high glass transition polyester material of the core, and the core being at least partially crystallized whereby the high glass transition polyester material of the core effectively has a higher softening point than a softening point of the PPS material of the sheath; and
   a porous membrane to which the plurality of bi-component fibers is fixedly attached.

6. The filter medium according to claim 5, wherein the high glass transition polyester material of the core of each bi-component fiber comprises a polyester derived from cyclohexanedimethanol and terephthalic acid.

7. The filter medium according to claim 5, wherein the core of each bi-component fiber comprises inorganic filler material.

8. The filter medium according to claim 7, wherein the inorganic filler material comprises at least one or more of titanium oxide, calcium carbonate and glass.

9. The filter medium according to claim 5, wherein the porous membrane comprises polytetrafluoroethylene (PTFE).

10. The filter medium according to claim 5, wherein the plurality of bi-component fibers are disposed to form a felt material, which is laminated to the porous membrane.

11. The filter medium according to claim 10, wherein the felt material is needlepunched.

12. The filter medium according to claim 5, further comprising a woven scrim disposed among the plurality of bi-component fibers.

13. A filter element for use in filtering flue gas from a coal-fired boiler, the filter element comprising the filter medium according to claim 5.

14. A method of forming a filter medium, comprising:
manufacturing a plurality of bi-component fibers, each bi-component fiber including a sheath formed of polyphenylene sulfide (PPS) and a core formed of a high glass transition polyester, a PPS material of the sheath having a higher melting point than a high glass transition polyester material of the core, and the core being at least partially crystallized whereby the high glass transition polyester material of the core effectively has a higher softening point than a softening point of the PPS material of the sheath;
assembling the plurality of bi-component fibers into a felt material; and
laminating the felt material onto a porous membrane.

15. The method according to claim 14, wherein the manufacturing of the plurality of bi-component fibers comprises delaying a cooling process of each bi-component fiber to crystallize the high glass transition polyester material of the core.

16. The method according to claim 14, wherein the manufacturing of the plurality of bi-component fibers comprises adding inorganic filler material to the high glass transition polyester material of the core.

17. The method according to claim 16, wherein the inorganic filler material comprises at least one or more of titanium oxide, calcium carbonate and glass.

18. The method according to claim 14, wherein the assembling comprises needlefelting.

19. The method according to claim 14, further comprising disposing a woven scrim among the plurality of bi-component fibers.

20. The method according to claim 14, wherein the laminating the felt material onto the porous membrane comprises a thermal lamination process.

21. A felt, comprising:
a plurality of bi-component fibers, each bi-component fiber comprising:
a sheath formed of polyphenylene sulfide (PPS); and
a core formed of a high glass transition polyester,
a PPS material of the sheath having a higher melting point than a high glass transition polyester material of the core, and
the core being at least partially crystallized whereby the high glass transition polyester material of the core effectively has a higher softening point than a softening point of the PPS material of the sheath.

22. The felt according to claim 21, wherein the high glass transition polyester material of the core of each bi-component fiber comprises a polyester derived from cyclohexanedimethanol and terephthalic acid.

23. The felt according to claim 21, wherein the core of each bi-component fiber comprises inorganic filler material.

24. The felt according to claim 21, further comprising a woven scrim disposed among the plurality of bi-component fibers.

* * * * *